United States Patent
Sandgren et al.

(10) Patent No.: US 12,477,460 B2
(45) Date of Patent: Nov. 18, 2025

(54) KEEPING A TIME REFERENCE

(71) Applicant: Telefonaktiebolaget LM Ericsson (publ), Stockholm (SE)

(72) Inventors: Magnus Sandgren, Staffanstorp (SE); Henrik Sjöland, Lund (SE); Magnus Åström, Lund (SE); Gang Zou, Lund (SE); Pramod Jacob Mathecken, Lomma (SE); Mohammed Zourob, Bunkeflostrand (SE); Leif Wilhelmsson, Lund (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 609 days.

(21) Appl. No.: 17/778,042

(22) PCT Filed: Dec. 20, 2019

(86) PCT No.: PCT/EP2019/086840
§ 371 (c)(1),
(2) Date: May 19, 2022

(87) PCT Pub. No.: WO2021/121636
PCT Pub. Date: Jun. 24, 2021

(65) Prior Publication Data
US 2022/0417850 A1 Dec. 29, 2022

(51) Int. Cl.
*H04W 52/02* (2009.01)
*H04W 56/00* (2009.01)

(52) U.S. Cl.
CPC ... *H04W 52/0216* (2013.01); *H04W 52/0229* (2013.01); *H04W 56/0015* (2013.01)

(58) Field of Classification Search
CPC ......... H04W 52/0216; H04W 52/0229; H04W 56/0015
See application file for complete search history.

(56) References Cited

U.S. PATENT DOCUMENTS

| | | |
|---|---|---|
| 2013/0235773 A1 | 9/2013 | Wang et al. |
| 2014/0293851 A1 | 10/2014 | Abraham et al. |
| 2019/0059053 A1 | 2/2019 | Qaderi et al. |

OTHER PUBLICATIONS

Mani, S. et al., "An Architecture for IoT Clock Synchronization", IOT 2018: Proceedings of the 8th International Conference on the Internet of Things, Oct. 15, 2018, pp. 1-8, ACM.

(Continued)

*Primary Examiner* — Wayne H Cai
(74) *Attorney, Agent, or Firm* — COATS & BENNETT, PLLC

(57) ABSTRACT

A method is disclosed—for a wireless communication device served by a network access node—of keeping a time reference at the wireless communication device. The wireless communication device is configured for operation according to at least first and second operational modes, the second operational mode having lower power consumption than the first operational mode. The method comprises (during operation according to the first operational mode) determining (for the second operational mode) desired timings of timing signals to be transmitted from the network access node, and transmitting a request signal to the network access node, wherein the request signal carries information of the desired timings of timing signals to be transmitted from the network access node. In some embodiments, the method further comprises receiving a response signal from the network access node, wherein the response signal carries information of actual timings of timing signals to be transmitted from the network access node. Corresponding method for a network access node, apparatuses, wireless communication device, network access node and computer program product are also disclosed.

20 Claims, 4 Drawing Sheets

(56) References Cited

OTHER PUBLICATIONS

Goetz, F. et al., "Draft Dual Time Scale in Factory & Energy Automation: White Paper about Industrial Requirements and Concepts @ Time Synchronication", V 1.02, Jul. 16, 2012, pp. 1-26, IEEE 802.1ASbt Industrial Requirements, IEEE.

Chang, T. et al., "Adaptive synchronization in multi-hop TSCH networks", Computer Networks, vol. 76, Jan. 15, 2015, pp. 165-176, Elsevier.

KEEPING A TIME REFERENCE

TECHNICAL FIELD

The present disclosure relates generally to the field of wireless communication. More particularly, it relates to keeping of a time reference at a wireless communication device.

BACKGROUND

It may be desirable for wireless communication devices and/or network access nodes to enter a low power mode (e.g., a sleep mode) during periods of no, or very scarce, activity.

However, when either or both of a network access node and an associated wireless communication device are in low power mode, it is generally a problem for them to maintain a common time reference. Example causes of this problem include oscillator drift and temperature variation (internal and/or ambient). The problem typically becomes more prominent the longer the periods in low power mode are.

Therefore, there is a need for approaches to keeping a time reference at a wireless communication device. Preferably, such approaches are suitable for use when the wireless communication device is in an operational mode having lower power consumption than a default operational mode. The default operational mode may, for example, be an idle mode or a connected mode.

SUMMARY

It should be emphasized that the term "comprises/comprising" (replaceable by "includes/including") when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Generally, when an arrangement is referred to herein, it is to be understood as a physical product; e.g., an apparatus. The physical product may comprise one or more parts, such as controlling circuitry in the form of one or more controllers, one or more processors, or the like.

It is an object of some embodiments to solve or mitigate, alleviate, or eliminate at least some of the above or other problems and/or disadvantages.

A first aspect is a method for a wireless communication device served by a network access node. The method is a method of keeping a time reference at the wireless communication device, wherein the wireless communication device is configured for operation according to at least first and second operational modes, the second operational mode having lower power consumption than the first operational mode.

The method comprises (during operation according to the first operational mode) determining (for the second operational mode) desired timings of timing signals to be transmitted from the network access node, and transmitting a request signal to the network access node, wherein the request signal carries information of the desired timings of timing signals to be transmitted from the network access node.

In some embodiments, the method further comprises receiving a response signal from the network access node, wherein the response signal carries information of actual timings of timing signals to be transmitted from the network access node.

In some embodiments, the method further comprises switching to operation according to the second operational mode when the actual timings correspond to the desired timings.

In some embodiments, the method further comprises switching to operation according to the second operational mode when at least some of the actual timings correspond to the desired timings.

In some embodiments, the method further comprises acquiring an initial time reference during operation according to the first operational mode, and updating the time reference based on reception of the timing signals during operation according to the second operational mode.

In some embodiments, the method further comprises switching to operation according to the first operational mode when reception of one or more timing signals fails.

In some embodiments, the timings of timing signal transmissions from the network access node are defined by one or more of a periodicity of the timing signal transmissions, and windows of time within which the timing signal transmissions occur.

In some embodiments, the desired timings are determined based on one or more of an oscillator drift of the wireless communication device, a temperature characteristic of the wireless communication device, and a required time reference accuracy of the wireless communication device.

A second aspect is a method for a network access node serving a wireless communication device. The method is a method of providing a time reference for the wireless communication device.

The method comprises receiving a request signal from the wireless communication device, wherein the request signal carries information of desired timings of timing signals to be transmitted from the network access node, and determining actual timings of the timing signals to be transmitted from the network access node based on the desired timings.

In some embodiments, the method further comprises transmitting a response signal to the wireless communication device, wherein the response signal carries information of the actual timings of timing signals to be transmitted from the network access node.

In some embodiments, the method further comprises providing an initial time reference for the wireless communication device, and transmitting the timing signals according to the actual timings.

In some embodiments, the timings of timing signal transmissions from the network access node are defined by one or more of a periodicity of the timing signal transmissions, and windows of time within which the timing signal transmissions occur.

A third aspect is a computer program product comprising a non-transitory computer readable medium, having thereon a computer program comprising program instructions. The computer program is loadable into a data processing unit and configured to cause execution of the method according to any of the first and second aspects when the computer program is run by the data processing unit.

A fourth aspect is an apparatus for a wireless communication device configured to be served by a network access node. The apparatus is for keeping a time reference at the wireless communication device, wherein the wireless communication device is configured for operation according to at least first and second operational modes, the second operational mode having lower power consumption than the first operational mode.

The apparatus comprises controlling circuitry configured to cause (during operation according to the first operational mode) determination (for the second operational mode) of desired timings of timing signals to be transmitted from the network access node, and transmission of a request signal to the network access node, wherein the request signal carries information of the desired timings of timing signals to be transmitted from the network access node.

A fifth aspect is a wireless communication device comprising the apparatus of the fourth aspect.

A sixth aspect is an apparatus for a network access node configured to serve a wireless communication device. The apparatus is for providing a time reference for the wireless communication device.

The apparatus comprises controlling circuitry configured to cause reception of a request signal from the wireless communication device, wherein the request signal carries information of desired timings of timing signals to be transmitted from the network access node, and determination of actual timings of the timing signals to be transmitted from the network access node based on the desired timings.

A seventh aspect is a network access node comprising the apparatus of the sixth aspect.

In some embodiments, any of the above aspects may additionally have features identical with or corresponding to any of the various features as explained above for any of the other aspects.

Generally, when a network node is referred to herein, the term is meant to encompass a network access node such as, for example, a base station, a gNodeB, an eNodeB, an access point (AP), etc.

Also generally, when a wireless communication device is referred to herein, the term is meant to encompass a terminal node such as, for example, a user equipment (UE), a station (STA), an Internet-of-Things (IoT) device, etc.

An advantage of some embodiments is that approaches to keeping a time reference at a wireless communication device are provided.

An advantage of some embodiments is that low power mode operation (e.g., application of a sleep mode) of wireless communication devices and/or network access nodes is facilitated. This may in turn have the advantage of decreased power/energy consumption at wireless communication devices and/or network access nodes.

An advantage of some embodiments is a time reference can be maintained with acceptable accuracy at a wireless communication device, at a relatively low power consumption for the wireless communication device and/or the network access node.

BRIEF DESCRIPTION OF THE DRAWINGS

Further objects, features and advantages will appear from the following detailed description of embodiments, with reference being made to the accompanying drawings. The drawings are not necessarily to scale, emphasis instead being placed upon illustrating the example embodiments.

DETAILED DESCRIPTION

As already mentioned above, it should be emphasized that the term "comprises/comprising" (replaceable by "includes/including") when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Embodiments of the present disclosure will be described and exemplified more fully hereinafter with reference to the accompanying drawings. The solutions disclosed herein can, however, be realized in many different forms and should not be construed as being limited to the embodiments set forth herein.

In the following, embodiments will be described where a time reference is maintained at a wireless communication device using a timing signal, while the wireless communication device and/or an associated network access node is in a low power mode.

To save power, the wireless communication device should receive the timing signal as seldom as possible under the condition that the time reference should be adequately maintained. Furthermore, if the network access node is to be able to go into a low power mode, it may be beneficial that it knows that there are wireless communication devices requiring timing signals and when the timing signals are expected. Therefore, some embodiments relate to a negotiation/agreement between the wireless communication device and the associated network access node regarding timings of the timing signal.

Figure 1:
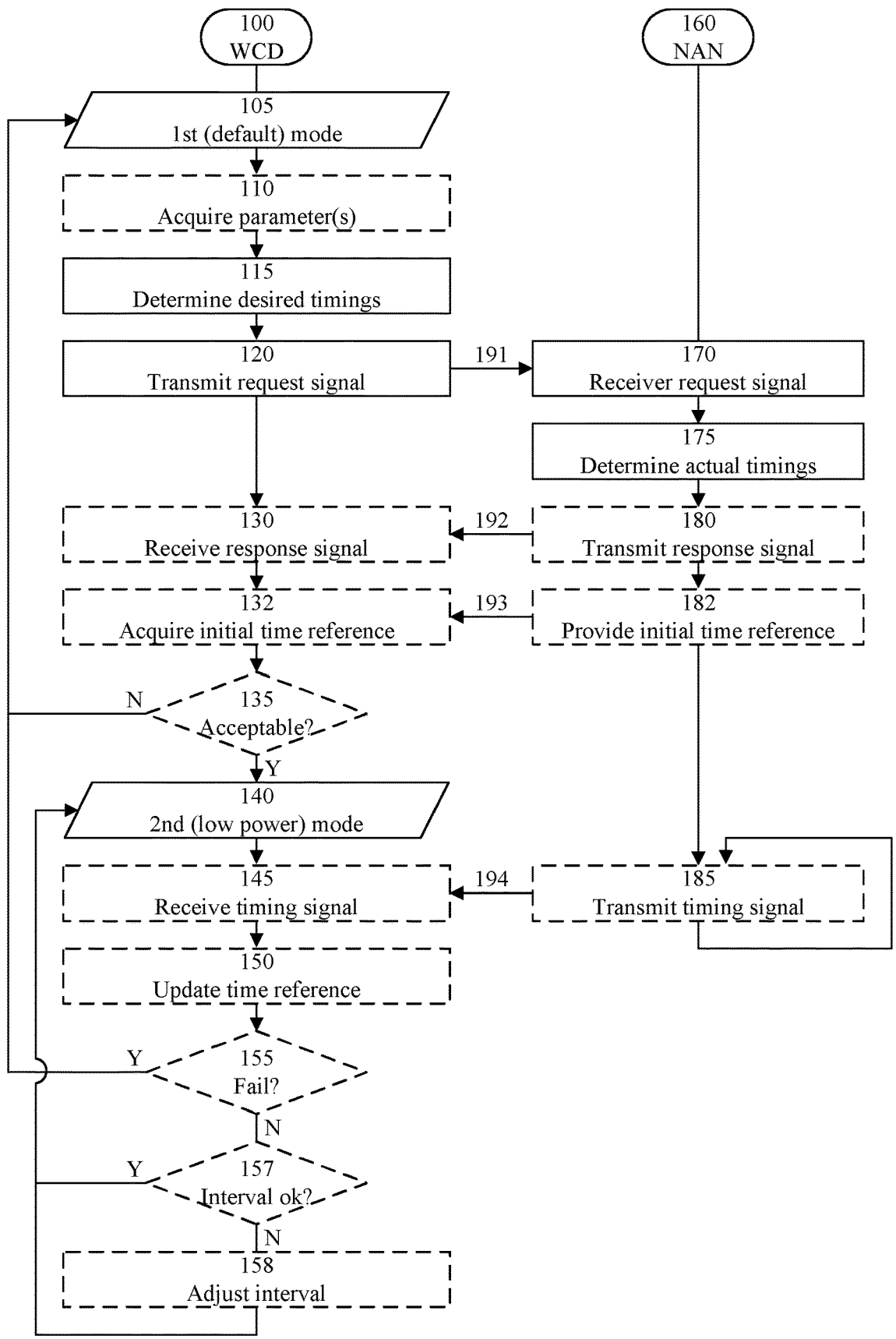
FIG. 1 is a combined flowchart and signaling diagram illustrating example method steps and signaling according to some embodiments.

FIG. 1 illustrates example method steps and signaling according to some embodiments. The method steps are performed by a wireless communication device, WCD, 100 (left part of FIG. 1) or by a network access node, NAN, 160 serving the wireless communication device (right part of FIG. 1).

The wireless communication device is configured for operation according to at least first and second operational modes. The second operational mode has lower power consumption than the first operational mode. For example, the first operational mode may be a default operational mode (e.g., an idle mode or a connected mode) and the second operational mode may be a low power mode (e.g., a sleep mode, such as a light sleep mode or a deep sleep mode).

The method is for keeping a time reference at the wireless communication device. Typically, the method is for keeping the time reference during operation according to the second operational mode.

Keeping a time reference may, for example, comprise maintaining the time reference within an acceptable time deviation interval. The acceptable time deviation interval may be defined based on a maximum time reference deviation (between the wireless communication device and the network access node) for which it is possible to recover a more accurate time reference while remaining in the second operational mode.

In the context of some embodiments, keeping a time reference may comprise one or more of acquiring/obtaining a time reference (e.g., receiving a time reference from a network access node and/or transferring a time reference between different circuitry of the wireless communication device), maintaining/retaining a time reference (e.g., by internal time keeping, such as one based on a local oscillator signal), and provisioning a time reference (e.g., transferring a time reference between different circuitry of the wireless communication device).

During operation according to the first operational mode (as illustrated by 105), the WCD determines desired timings, of timing signals to be transmitted from the network access node for the second operational mode, as illustrated by step 115.

The desired timings may be determined in any suitable way. Typically, the absolute timing accuracy of the wireless communication device may be based on the internal service running in the wireless communication device, and the time between received timing signals. The time between received timing signals, i.e., between correction possibilities for the time reference, should typically allow for internal timing drift (i.e., drift of the time reference; e.g., due to one or more of: oscillator characteristics, temperature drift, etc.) to take place. Alternatively or additionally, the desired timings may be determined such that it is deemed possible for the wireless communication device to receive a timing signal transmitted according to the desired timings even if a time deviation (timing drift) has occurred since a previous reception of a timing signal transmitted according to the desired timings.

The desired timings may, for example, be defined in the form of a desired periodicity of the timing signal transmissions (i.e., how often the timing signals are desired to be received), and/or windows of time within which timing signal transmissions are desired to occur (i.e., periods of time during which it is desired to receive timing signals), and/or a desired transmission slot for each timing signal transmission (i.e., a period of time during which a receiver of the wireless communication device will listen to it). The desired timings may be expressed in any suitable way, e.g., in absolute or relative terms.

Typically, the desired timings may comprise a trade-off between the length of the desired transmission slot when a receiver of the wireless communication device listens for a timing signal (e.g., a time period when the receiver is not in a sleep mode), and the periodicity such that it is deemed possible for the wireless communication device to receive a timing signal transmitted accordingly. A relatively long listening period may provide for the possibility of relatively rare timing signal transmissions, while relatively frequent timing signal transmissions may provide for the possibility of a relatively short listening period.

In some embodiments, the desired timings are selected such that it is deemed just barely (e.g., using a guard margin) possible for the wireless communication device to receive a timing signal transmitted accordingly.

Deeming whether desired timings make it possible for the wireless communication device to receive a timing signal transmitted accordingly may be based on any suitable approach.

Typically, the desired timings are determined based on knowledge or estimation of a time drift (e.g., a worst case time drift) of the wireless communication device during operation according to the second operational mode (e.g., relative to a reference time of the network access node). A time drift may have one or more of a large variety of causes. Some examples include oscillator drift of the wireless communication device, and temperature characteristics of the wireless communication device (e.g., temperature, temperature change, temperature change rate, etc.).

Alternatively or additionally, the desired timings may be determined based on knowledge or estimation of a required time reference accuracy of the wireless communication device. For example, the required time reference accuracy may vary depending on the service(s) the wireless communication device is involved in.

Thus, the desired timings may, according to some embodiments, be determined based on one or more of an oscillator drift of the wireless communication device, a temperature characteristic of the wireless communication device, and a required time reference accuracy of the wireless communication device.

As illustrated by optional step 110, the WCD may acquire knowledge or estimation of one or more parameters to be used for determining the desired timings. For example, the oscillator drift may be known or measured internally in the wireless communication device, a temperature prediction may be made based on temperature characteristics measured by the wireless communication device and/or based on temperature statistics received by the wireless communication device, the required time reference accuracy may be known internally in the wireless communication device, etc.

When the desired timings have been determined in step 115, the WCD transmits a request signal 191 to the network access node, as illustrated by step 120. The request signal carries information of the desired timings of timing signals to be transmitted from the network access node, and is received by the NAN in step 170.

In step 175, the NAN determines actual timings of the timing signals to be transmitted from the network access node based on the desired timings. Generally, the actual timings may define when the timing signals will be transmitted by the network access node.

The actual timings may, for example, be defined in the form of an actual periodicity of the timing signal transmissions (i.e., how often the timing signals will be transmitted), and/or windows of time within which timing signal transmissions will occur (i.e., periods of time during which timing signals will be transmitted), and/or an actual transmission slot for each timing signal transmission (i.e., a period of time within which the timing signal transmission will occur; which should preferably be covered by a listening period of a receiver of the wireless communication device). A point in time is to be considered as a special case of a time period.

The window of time may, typically, refer to a period during which the NAN will be able to transmit timing signals (e.g., a period when it is not in a low power mode, such as—for example—"weekdays between 7 a.m. and 6 p.m.").

The actual timings may be expressed in any suitable way, e.g., in absolute or relative terms.

The NAN may determine the actual timings as accommodating the desired timings. This may typically be applicable when the NAN will not be in a low power mode (e.g., since it has other activities to perform). The actual timings accommodating the desired timings may comprise that the actual timings coincide with the desired timings, that all desired timings coincide with some desired timings (i.e., at least some of the actual timings correspond to the desired timings), that the actual timings are more frequent (have shorter period) than the desired timings, etc.

The NAN may determine the actual timings as not accommodating the desired timings. This may typically be applicable when the NAN will be in a low power mode (e.g., since it has no other activities to perform). The actual timings not accommodating the desired timings may comprise that the actual timings do not coincide with the desired timings, that at least some desired timings do not coincide with desired timings, that the actual timings are less frequent (have longer period) than the desired timings, etc.

The NAN may determine the actual timings as partly accommodating the desired timings. This may typically be applicable when the NAN will transmit timing signals (e.g., due to timing signal requests from other wireless communication devices), but not in accordance with the desired timings. The actual timings partly accommodating the desired timings may comprise that at least some desired timings coincide with desired timings, that the actual timings are almost as frequent as the desired timings, etc.

In some embodiments, the NAN may determine the actual timings of the timing signals to be transmitted from the network access node based on the desired timings and based on other factors that the network deems suitable (e.g., desired timings of other wireless communication devices).

As illustrated by optional step 180, the NAN may transmit a response signal 192 to the WCD. The response signal carries information of the actual timings of timing signals to be transmitted from the network access node, and is received by the WCD as illustrated by optional step 130.

For example, the response signal may indicate a periodicity and/or window of time and/or an actual transmission slot for transmission of the timing signals. Alternatively or additionally, the response signal may indicate whether the actual timings accommodate the desired timings, do not accommodate the desired timings, or partly accommodate the desired timings. In the latter two cases, the response signal may further indicate one or more alternative network access nodes that might accommodate the desired timings.

The WCD may evaluate the information of the response signal regarding actual timings, and determine whether or not it is acceptable, as illustrated by optional step 135.

When the actual timings are considered not acceptable (e.g., when actual timings do not accommodate the desired timings, or partly accommodate the desired timings—but in a way that will not enable the WCD to keep its time reference), the WCD may decide to remain in the first operational mode, as illustrated by the N-path out of step 135 returning to 105. In this case, the WCD may optionally attempt to negotiate to receive timing signals from another network access node (e.g., by repeating the steps 120 and 130 for the other network access node).

When the actual timings are considered acceptable (e.g., when actual timings accommodate the desired timings, or partly accommodate the desired timings in a way that will enable the WCD to keep its time reference), the WCD may decide to switch to operation according to the second operational mode, as illustrated by the Y-path out of step 135 proceeding to 140.

Before the switch to the second operational mode, the WCD may acquire an initial time reference 193 provided by the NAN, as illustrated by optional steps 182 and 132. In FIG. 1, these steps are illustrated as occurring after steps 180 and 130, respectively. However, the provision/acquisition of the initial time reference 193 may occur at any suitable time during operation by the WCD according to the first operational mode. For example, the provision/acquisition of the initial time reference may correspond to any default time synchronization between WCD and NAN; using an absolute time reference (e.g., global positioning system—GPS—or universal time clock—UTC—time) and/or a local time reference for the communication system (e.g., conveyed by a signal information block—SIB).

In the second operation mode, the WCD receives the timing signals 194 transmitted by the NAN in accordance with the actual timings, as illustrated by optional steps 185 and 145.

Typically, the reception of step 145 is performed by a simple receiver (other than the main receiver) of the WCD, to avoid unnecessary power consumption. Example simple receivers include an envelope detector, a matched filter detector, a correlator and peak detector, etc.

To this end the timing signal may be specifically designed to be receivable (e.g., detectable) by such a simple receiver. Examples of such a timing signal include an on-off keying (OOK) signal that can be detected using a simple envelope detector. OOK signals facilitate low power consumption reception because of the property of having only two possibilities regarding the envelope, which makes it possible to use an envelope detector design with low power consumption. Generally, other signal types can be used as a timing signal, exploiting signal properties that facilitate use of simple receivers designs with low power consumption.

Generally, the timing signal (TS; may also be termed synchronization signal) may be a signal specifically dedicated for the purposes described herein, or may be a signal used also for other purposes. For example, the timing signal may be a specifically dedicated signal which is transmitted more seldom than a default synchronization signal (e.g., a synchronization signal block—SSB).

After reception of the timing signal in step 145, the WCD updates its time reference based on the received timing signal, as illustrated by optional step 150. In some embodiments, step 150 may also comprise post-processing of time stamps generated since the previous timing signal reception, wherein the time stamps are adjusted (e.g., using interpolation between the previous and the current timing signal receptions) to mitigate the effect of time drift.

If reception of the timing signal aimed for in step 145 fails, the WCD may decide to switch back from operation according to the second operational mode to operation according to the first operational mode, as illustrated by the Y-path out of optional step 155 returning to 105. Even if not shown in FIG. 1, this may also comprise the WCD informing the NAN that the WCD no longer desires timing signals to be transmitted.

An alternative action that may be performed if reception of the timing signal aimed for in step 145 fails, is to seize attempts to keep the time reference. This, may be suitable, for example, if the WCD concludes that there is no service at all regarding timing signals. Then the WCD may be turn off completely, and when turning on again typically uses its main receiver to re-acquire time synchronization with the NAN. One scenario where this approach may be suitable is during weekends in an industry facility, for example, where all network access nodes are turned off.

As long as the timing signal reception of step 145 does not fail, the WCD may decide to remain in operation according to the second operational mode and keep the time reference accordingly, as illustrated by N-path out of optional step 155 eventually returning to 140.

In connection with step 150, the WCD may also decide to adjust the interval for listening to timing signals (e.g., if it is determined as needed or otherwise advisable), as illustrated by optional step 158 reached via the N-path out of optional step 157. The Y-path out of step 157 corresponds to no adjustment being performed.

The adjustment (increase or decrease, as applicable) in step 158 may be performed when the time reference drift changes for some reason (e.g., due to a temperature change) and/or when the time accuracy required for a service changes.

For example, when a decreased time reference drift is detected and/or a more relaxed service-related time accuracy is applicable, the interval may be increased in step 158. Correspondingly, when an increased time reference drift is detected and/or a more strict service-related time accuracy is applicable, the interval may be decreased in step 158.

Alternatively or additionally, when it is determined that the time reference is persistent over time (no/low time reference drift), the interval may be increased in step 158.

In these embodiments, step 158 may further comprise notifying the network accordingly; potentially allowing it to reduce the periodicity of transmitted timing signals.

Alternatively or additionally, the adjustment in step 158 may be such that a subsequent timing signal is estimated to be received mid-way through a time slot where the WCD listens for it. For example, if reception of the timing signal aimed for in step 145 nearly fails—e.g., if the timing signal is received, but very close to the start or the end of a time slot where the WCD listens for it—the WCD may decide to decrease or increase the interval accordingly (e.g., by roughly half the listening time slot length).

Some embodiments may be summarized as follows:
  The device (WCD) receives an initial absolute time reference (e.g., GPS time) with a relation to cellular frame timing (compare with step 132).
  The device receives/acquires information regarding how accurately it needs to maintain synchronization (compare with 110).
  Based on the required synchronization accuracy, the inherent properties of the device (e.g., hardware characteristics used for timing generation, such as a local oscillator), and the operational environment (e.g., temperature characteristics), the device determines how to maintain synchronization while attempting to minimize power/energy consumption (compare with 135). As mentioned above, maintaining synchronization may involve using a simplified receiver for reception of the timing signals used to maintain time synchronization.
  When it is determined to enter a low power mode, the device determines how often it needs to re-synchronize to the time reference provided by the network (compare with 115).
  Through negotiation with the network, the device aims at guaranteeing that the needed timing signals are transmitted from the network. Further, the negotiation may aim to avoiding that the network access node sends timing signals more often than needed.

Figure 2:
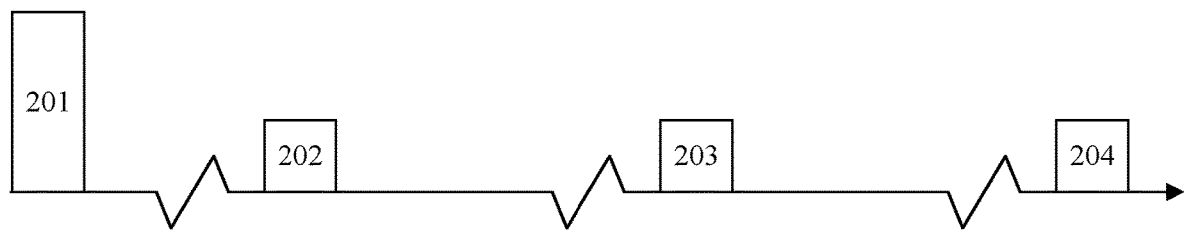
FIG. 2 is a schematic timing diagram illustrating example operations of a wireless communication device according to some embodiments.

FIG. 2 schematically illustrates example operations of a wireless communication device (WCD) according to some embodiments; as a function of time. As illustrated by 201, the WCD is first in a default operational mode (e.g., a connected mode; compare with 105), wherein an initial time reference is acquired (compare with 132). Then, the WCD enters a low power mode (e.g., a sleep mode; compare with 140), during which it receives timing signals at occasions (actual timings) negotiated with the network access node as illustrated by 202, 203, and 204 (compare with 145).

Figure 3:
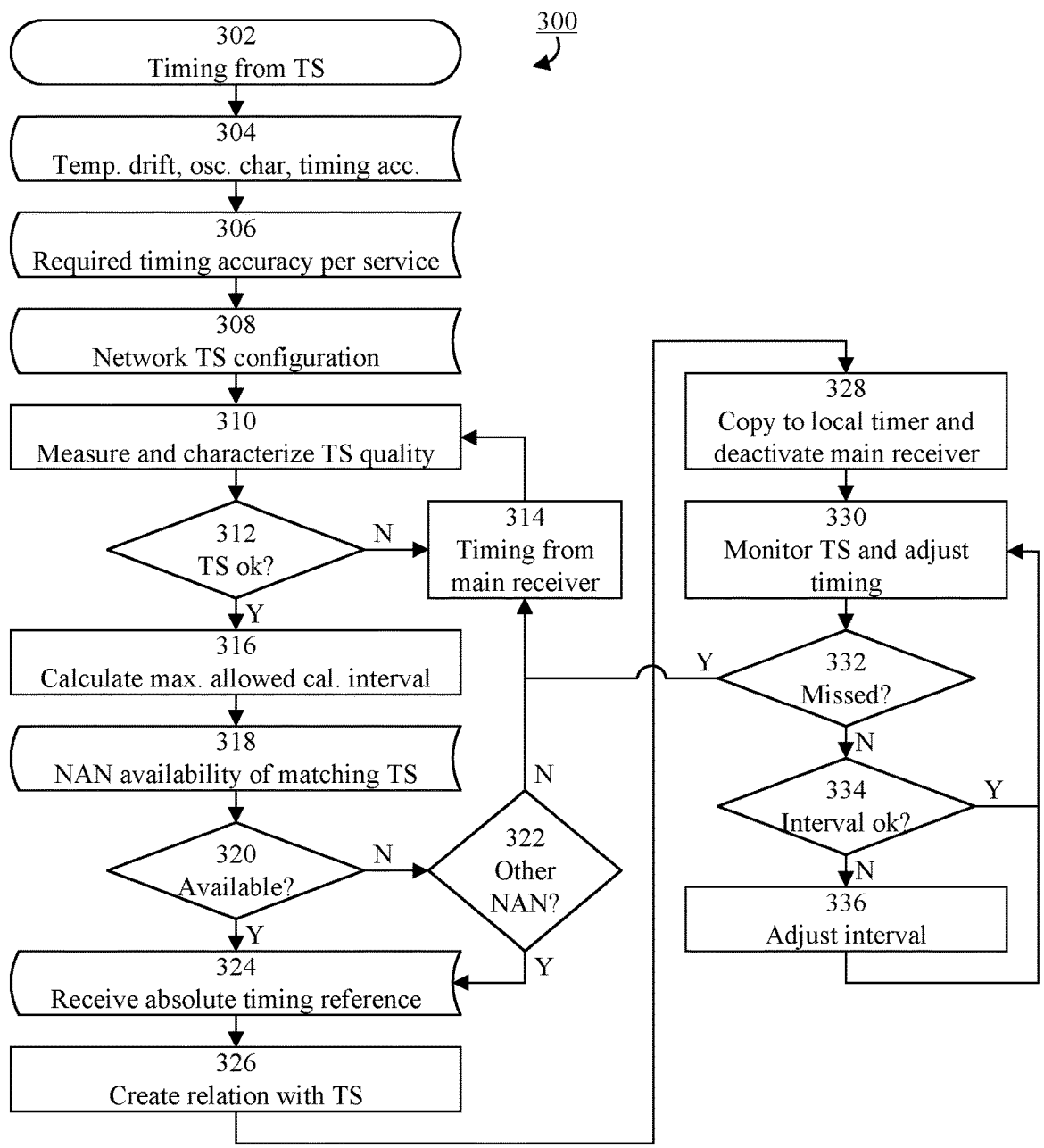
FIG. 3 is a flowchart illustrating example method steps according to some embodiments.

FIG. 3 illustrates an example method 300 according to some embodiments. The method 300 may, for example, be considered as an implementation of the WCD method of FIG. 1. As illustrated by 302, the method concerns maintaining timing based on a timing signal (TS).

In steps 304 and 306 (compare with 110 of FIG. 1), relevant parameters are acquired; such as temperature drift (e.g., a maximum temperature drift rate), oscillator characteristics, and required timing accuracy (e.g., based on service(s) and/or internal accuracy conditions).

In step 308, information regarding a network configuration for TS is acquired, and in step 310, it is determined whether the configured TS can enable maintenance of the time reference.

If not (N-path out of step 312), the configured TS is not trusted for time reference maintenance. Instead, timing is maintained using a main receiver as in the default mode (compare with 105 of FIG. 1) as illustrated by 314. Re-evaluation of the TS may be carried out as illustrated by the loop-back to 310 from 314.

If the configured TS seems to enable maintenance of the time reference during low power mode (Y-path out of step 312), preparations are made for entering the low power mode.

In step 316 (compare with 115 of FIG. 1), a maximum allowed calibration interval is calculated, and in step 318 (compare with 130 of FIG. 1), information is acquired regarding TS timing of the network access node.

In step 320 (compare with 135 of FIG. 1), it is determined if the TS timing of the network access node matches the maximum allowed calibration interval.

If not (N-path out of step 320), attempt may be made to find another network access node providing a matching TS, as illustrated by step 322, before resorting to maintaining timing using a main receiver in the default mode in 314. Information regarding another network access node providing a matching TS may be provided by the network access node first inquired, or the WCD may autonomously try to find another network access node providing a matching TS.

If the TS timing of the network access node matches the maximum allowed calibration interval (Y-path out of step 320), preparations for entering the low power mode are continued.

In step 324 (compare with 132 of FIG. 1), an absolute timing reference is received, and in step 326, the absolute timing reference is related to the timings of the TS.

In step 328, the time information is copied to a local timer of a simplified receiver and the main receiver is deactivated; thereby entering a low power mode (compare with 140 of FIG. 1), wherein the TS is monitored to adjust the local timer as illustrated by step 330 (compare with 145 of FIG. 1).

If the TS is missed (Y-path out of step 332; compare with 155 of FIG. 1), the main receiver is activated again; thereby exiting the low power mode.

If the TS is received (N-path out of step 332) and it is determined that the interval is to be adjusted for future receptions (N-path out of step 334; compare with 157 of FIG. 1), the interval is adjusted in step 336 (compare with 158 of FIG. 1) and the monitoring continues as illustrated by the loop-back to 330.

For example, step 334 may comprise determining whether there is a need to adjust the interval for future receptions (e.g., because future timing signals may otherwise be missed), and—if so—deciding to adjust the interval accordingly.

Alternatively or additionally, step 334 may comprise determining whether the time reference is persistent over time, and—if so—deciding to adjust (e.g., increase the length of) the interval; thereby relaxing the previously requested desired timings. In these embodiments, step 336 may further comprise notifying the network accordingly; potentially allowing it to reduce the periodicity of transmitted timing signals.

If the TS is received (N-path out of step 332) and the interval is not to be adjusted (Y-path out of step 334), the monitoring simply continues as illustrated by the loop-back to 330.

Figure 4:
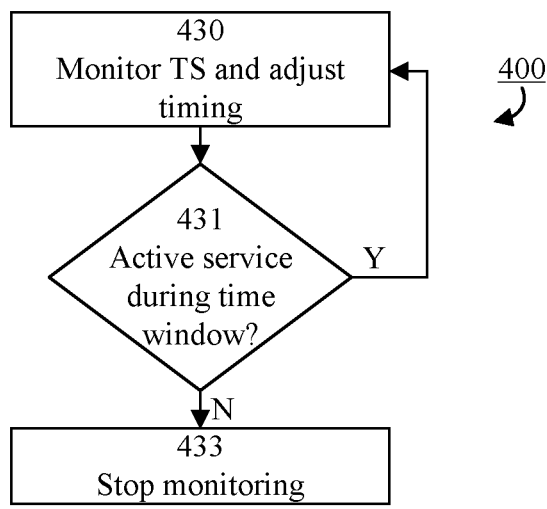
FIG. 4 is a flowchart illustrating example method steps according to some embodiments.

FIG. 4 illustrates an example method 400 according to some embodiments. The method 400 may, for example, be considered as an optional addition to any of the methods of FIG. 1 and FIG. 3. During monitoring of the TS in low power mode as illustrated by step 430 (compare with 145 of FIG. 1 and 330 of FIG. 3), it may be determined whether there is any active service for the WCD during a time window as illustrated by step 431. If so (Y-path out of step 431), the monitoring continues as illustrated by the loop-back to 430. If not (N-path out of step 431), the WCD may determine to stop monitoring the TS as illustrated by step 433; for example to be able to lower power consumption further. Even if not shown in FIG. 4, this may also comprise the WCD informing the NAN that the WCD no longer desires timing signals to be transmitted. Step 433 typically results in that the time reference is lost. Hence, when services are to be re-started, the time reference typically need to be re-established (e.g., using the default operational mode). An example where the method 400 may be useful is an industrial deployment in a factory that is closed down during a weekend. Then, it may be beneficial if the WCD:s turned off completely and re-started on Monday morning.

Figure 5:
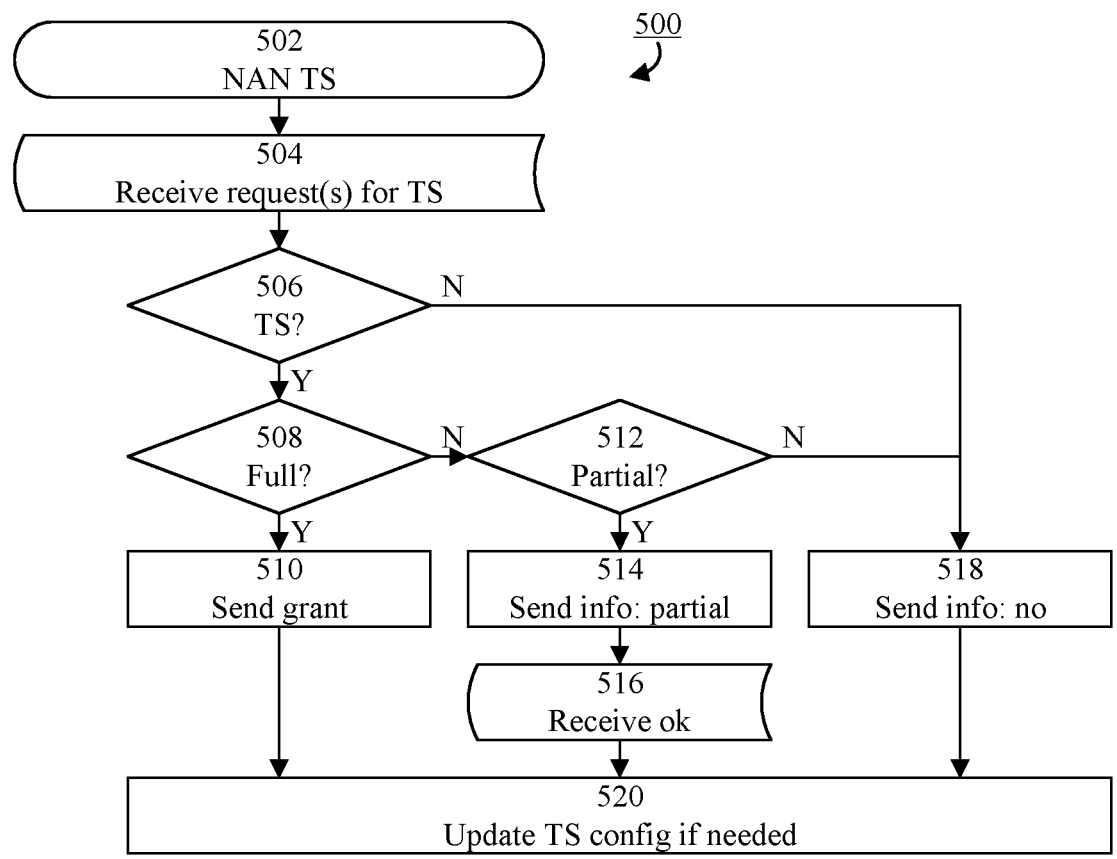
FIG. 5 is a flowchart illustrating example method steps according to some embodiments.

FIG. 5 illustrates an example method 500 according to some embodiments. The method 300 may, for example, be considered as an implementation of the NAN method of FIG. 1. As illustrated by 502, the method concerns the network access node provision of a timing signal.

In step 504 (compare with 170 of FIG. 1), the NAN receives respective requests for TS from one or more WCD:s.

If the NAN will not transmit TS—e.g., because it will be in deep sleep or turned off—(N-path out of step 506), the WCD:s are informed accordingly as illustrated by step 518.

If the NAN will transmit TS (Y-path out of step 506), it is determined to what extent actual timings of the TS transmissions may match the requested (desired) timings of 504.

WCD:s where there is a full match—i.e., the actual timings accommodate the desired timings—(Y-path out of step 508) are informed accordingly as illustrated by step 510.

WCD:s where there is a partial match—i.e., the actual timings accommodate the desired timings to some extent as elaborated on above—(N-path out of step 508 followed by Y-path out of step 512) are informed accordingly as illustrated by step 514.

WCD:s where there is no match—i.e., the actual timings do not accommodate the desired timings—(N-path out of step 512) are informed accordingly as illustrated by step 518.

Steps 506, 508, 512 may be compared with 175 of FIG. 1, and 510, 514, 518 may be compared with 180 of FIG. 1.

In step 520, the TS configuration may be updated in accordance with the matching particulars communicated to the WCD:s. For the cases with partial match, the NAN may further receive a response from the corresponding WCD, as illustrated by step 516, wherein the response indicates whether or not the WCD will use the offered TS. If a WCD will not use the offered TS, the NAN can dismiss the TS offer to that WCD before the configuration of step 520.

Figure 6:
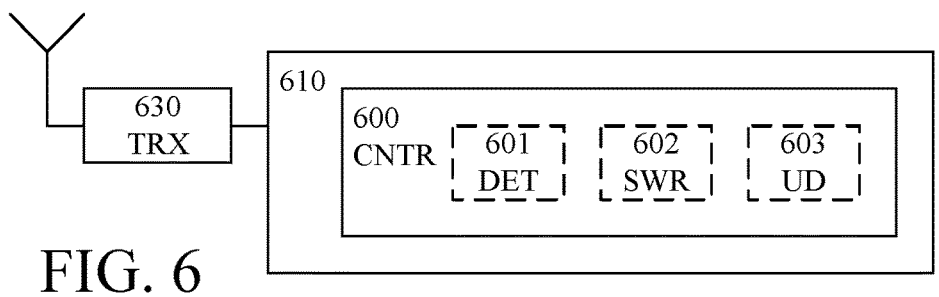
FIG. 6 is a schematic block diagram illustrating an example arrangement according to some embodiments.

FIG. 6 schematically illustrates an example apparatus 610 according to some embodiments. The apparatus is for a wireless communication device and may, for example, be configured to cause performance of one or more steps explained for the WCD 100 in connection to FIG. 1, or otherwise described herein. The apparatus may be comprisable (or comprised) in a wireless communication device according to some embodiments.

The wireless communication device is configured for operation according to at least first and second operational modes. The second operational mode has lower power consumption than the first operational mode.

The apparatus comprises a controller (CNTR; e.g., controlling circuitry or a control module) 600.

The controller is configured to cause (during operation according to the first operational mode) determination of desired timings of timing signals to be transmitted from a network access node for the second operational mode (compare with 115 of FIG. 1).

To this end, the controller may comprise or be otherwise associated with (e.g., connectable, or connected to) a determiner (DET; e.g., determination circuitry or a determination module) 601. The determiner may be configured to determine the desired timings of timing signals to be transmitted from the network access node for the second operational mode.

The controller is configured to cause transmission of a request signal to the network access node, wherein the request signal carries information of the desired timings of timing signals to be transmitted from the network access node (compare with 120 of FIG. 1).

To this end, the controller may comprise or be otherwise associated with (e.g., connectable, or connected to) a transmitter (e.g., transmission circuitry or a transmission module), illustrated in FIG. 6 as part of a transceiver TRX 630. The transmitter may be configured to transmit the request signal to the network access node.

The controller may be configured to cause reception of a response signal from the network access node, wherein the response signal carries information of actual timings of timing signals to be transmitted from the network access node (compare with 130 of FIG. 1).

To this end, the controller may comprise or be otherwise associated with (e.g., connectable, or connected to) a receiver (e.g., reception circuitry or a reception module), illustrated in FIG. 6 as part of the transceiver TRX 630. The receiver may be configured to receive the response signal from the network access node.

The controller may be configured to cause switching to operation according to the second operational mode responsive to the actual timings sufficiently accommodating the desired timings (compare with 135 and 140 of FIG. 1).

To this end, the controller may comprise or be otherwise associated with (e.g., connectable, or connected to) a switcher (SWR; e.g., switching circuitry or a switching module) 602. The switcher may be configured to switch to operation according to the second operational mode responsive to the actual timings sufficiently accommodating the desired timings.

The controller may be configured to cause acquisition of an initial time reference during operation according to the first operational mode (compare with 132 of FIG. 1), e.g. using the receiver.

The controller may be configured to cause reception of the timing signals during operation according to the second operational mode (compare with 145 of FIG. 1), e.g., using the receiver, or a low power version thereof.

The controller may be configured to cause updating of the time reference (compare with 150 of FIG. 1).

To this end, the controller may comprise or be otherwise associated with (e.g., connectable, or connected to) an updater (UD; e.g., updating circuitry or an updating module) 603. The updater may be configured to update the time reference.

Even though not illustrated in FIG. 6, the controller may, alternatively or additionally, comprise or be otherwise associated with (e.g., connectable, or connected to) other functional units (e.g., functional circuitry or functional modules), configured to perform one or more functions described herein (e.g., in connection to FIG. 1).

Figure 7:
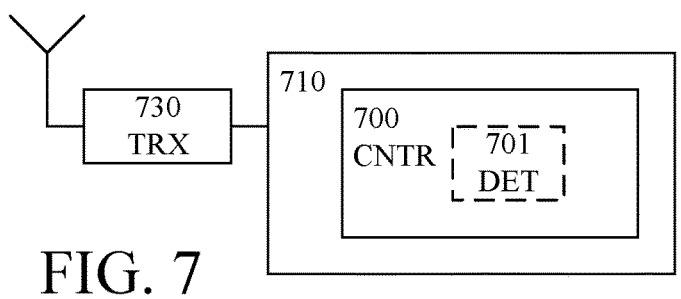
FIG. 7 is a schematic block diagram illustrating an example arrangement according to some embodiments.

FIG. 7 schematically illustrates an example apparatus 710 according to some embodiments. The apparatus is for a network access node and may, for example, be configured to cause performance of one or more steps explained for the NAN 160 in connection to FIG. 1, or otherwise described herein. The apparatus may be comprisable (or comprised) in a network access node according to some embodiments.

The network access node serves a wireless communication device, which is configured for operation according to at least first and second operational modes. The second operational mode has lower power consumption than the first operational mode.

The apparatus comprises a controller (CNTR; e.g., controlling circuitry or a control module) 700.

The controller is configured to cause reception of a request signal from the wireless communication device, wherein the request signal carries information of desired timings of timing signals to be transmitted from the network access node (compare with 170 of FIG. 1).

To this end, the controller may comprise or be otherwise associated with (e.g., connectable, or connected to) a receiver (e.g., reception circuitry or a reception module), illustrated in FIG. 7 as part of a transceiver TRX 730. The receiver may be configured to receive the request signal from the wireless communication device.

The controller is configured to cause determination of actual timings of the timing signals to be transmitted from the network access node based on the desired timings (compare with 175 of FIG. 1).

To this end, the controller may comprise or be otherwise associated with (e.g., connectable, or connected to) a determiner (DET; e.g., determination circuitry or a determination module) 701. The determiner may be configured to determine the actual timings of the timing signals to be transmitted from the network access node based on the desired timings.

The controller may be configured to cause transmission of a response signal to the wireless communication device, wherein the response signal carries information of the actual timings of timing signals to be transmitted from the network access node (compare with 180 of FIG. 1).

To this end, the controller may comprise or be otherwise associated with (e.g., connectable, or connected to) a transmitter (e.g., transmission circuitry or a transmission module), illustrated in FIG. 7 as part of the transceiver TRX 730. The transmitter may be configured to transmit the response signal to the wireless communication device.

The controller may be configured to cause provision of an initial time reference for the wireless communication device, and transmission of the timing signals according to the actual timings (compare with 182 and 185 of FIG. 1), e.g., using the transmitter.

Even though not illustrated in FIG. 7, the controller may, alternatively or additionally, comprise or be otherwise associated with (e.g., connectable, or connected to) other functional units (e.g., functional circuitry or functional modules), configured to perform one or more functions described herein (e.g., in connection to FIG. 1).

Figure 8:
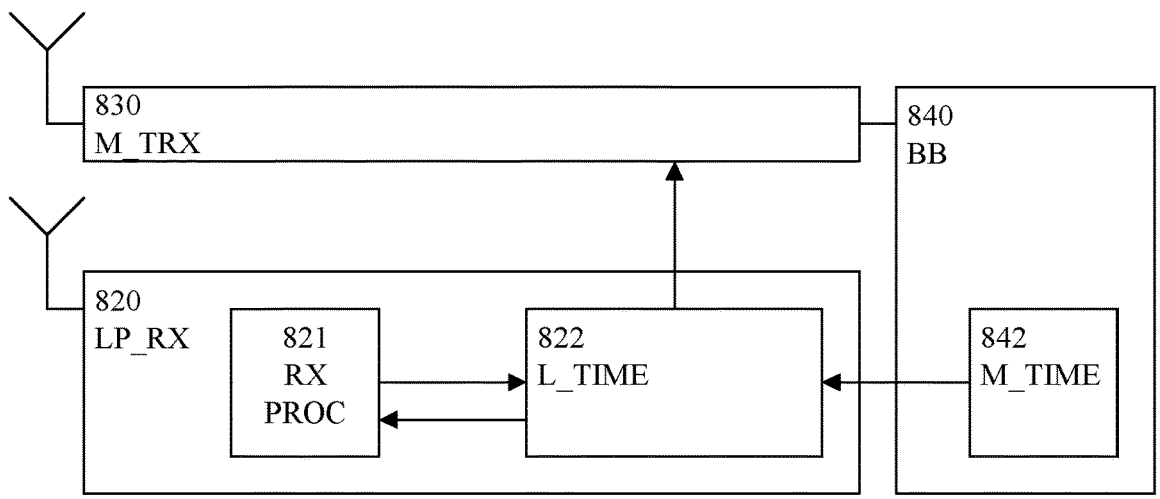
FIG. 8 is a schematic block diagram illustrating an example arrangement according to some embodiments.

FIG. 8 schematically illustrates an example arrangement for a WCD according to some embodiments. For example, the arrangement of FIG. 8 may be used in combination with the apparatus of FIG. 6.

The arrangement of FIG. 8 comprises a main transceiver (M_TRX) 830 configured to be used during the first operational mode, a low power receiver (LP_REC) 820 configured to be used during the second operational mode, and a baseband processor (BB) 840.

During the first operational mode, the main transceiver monitors default synchronization signals to maintain a main time reference (M_TIME) 842. In preparation for switching to the second operational mode, the main time reference may be transferred to a local time reference (L_TIME) 822 maintained in association with (e.g., comprised in, or operationally connected to) the low power receiver.

During the second operational mode, the low power receiver monitors the timing signals at occasions negotiated with the network access node using receiver processing means (RX PROC; e.g., receiver processing circuitry such as front end circuitry and a correlator) 821, and updates the local time reference 822 accordingly; as has been explained and exemplified above. The local time reference may be used to control the operations of the receiver processing means 821. If TS reception is missed (e.g., because there is no TS transmitted, because a TS cannot be detected due to poor channel conditions, because the local time reference has drifted more than expected, etc.) an interrupt signal may be issued for switching back to the first operational mode.

To exemplify application of some embodiments, an industry deployment scenario may be considered. In various forms of industrial communication and other applications where a—possibly large—number of wireless communication devices are used and need to be synchronized within a certain accuracy.

One example application includes a set of sensors, wherein it is important that the sensors are synchronized so that the different sensor data can be meaningfully related with one another. Even if sensor data is measured relatively often (e.g., once per minute), the sensor data may be stored in the sensor and sent to the network access node relatively seldom (e.g., once per day), so the network access node does not automatically know at what time the measurements were made for each piece of sensor data.

Thus, sensor data may need to be time-stamped to enable meaningful comparisons between data of different sensors. According to one example, when comparing data sensed at different locations, the measurements might need to have been made at approximately the same time in order to draw interesting conclusions. According to one example, data sensed at different locations need to be arranged in a time sequence in order to draw interesting conclusions (e.g., for sensors along a machine-line).

In this context, the required time accuracy typically depends on the service (typically needing less accurate timing than regular radio access). When radio access connection to the NAN is relatively rare (which may be the case for IoT-devices and/or devices for long lasting battery operation) the service running autonomously in the device will be dominating regarding time reference accuracy requirements.

One example application includes a set of actuators, wherein the network access node sends commands and/or updates to the actuators at certain predetermined time instants. An actuator may turn off its radio in between these time instants, but is expected to receive the transmissions at the predetermined time instants. Hence, the actuator needs to be synchronized to the network access node in order to limit the time the radio has to be turned on.

One example application includes a situation where two or more devices stay synchronized to a common time reference in order to minimize the time for the connection set-up in device-to-device (D2D) communications. An effective way to keep this type of synchronization may be by letting the different devices synchronize to a common time reference (e.g., provided by a network access node which is not involved in the data communication itself).

Even though there exist approaches for a UE to be time synchronized to a network access node and/or to have an accurate relation to an absolute time reference (e.g., a global positioning system—GPS—time), it may be a problem for the UE to maintain a reliable internal timing while operating at very low power level. The latter problem is addressed by some embodiments as exemplified above.

The described embodiments and their equivalents may be realized in software or hardware or a combination thereof. The embodiments may be performed by general purpose circuitry. Examples of general purpose circuitry include digital signal processors (DSP), central processing units (CPU), co-processor units, field programmable gate arrays (FPGA) and other programmable hardware. Alternatively or additionally, the embodiments may be performed by specialized circuitry, such as application specific integrated circuits (ASIC). The general purpose circuitry and/or the specialized circuitry may, for example, be associated with or comprised in an apparatus such as a wireless communication device or a network node.

Embodiments may appear within an electronic apparatus (such as a wireless communication device or a network node) comprising arrangements, circuitry, and/or logic according to any of the embodiments described herein. Alternatively or additionally, an electronic apparatus (such as a wireless communication device or a network node) may be configured to perform methods according to any of the embodiments described herein.

Figure 9:
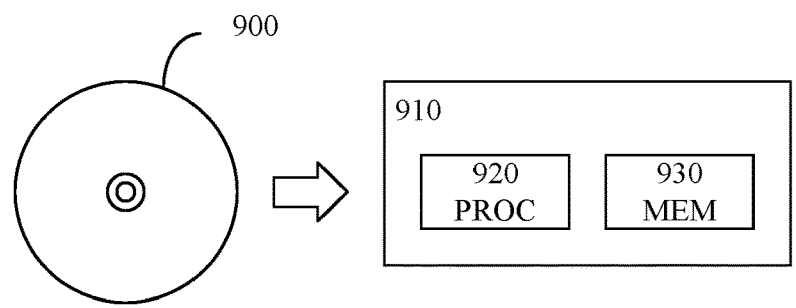
FIG. 9 is a schematic drawing illustrating an example computer readable medium according to some embodiments.

According to some embodiments, a computer program product comprises a tangible, or non-tangible, computer readable medium such as, for example a universal serial bus (USB) memory, a plug-in card, an embedded drive or a read only memory (ROM). FIG. 9 illustrates an example computer readable medium in the form of a compact disc (CD) ROM 900. The computer readable medium has stored thereon a computer program comprising program instructions. The computer program is loadable into a data processor (PROC; e.g., data processing circuitry or a data processing unit) 920, which may, for example, be comprised in a wireless communication device or a network node 910. When loaded into the data processor, the computer program may be stored in a memory (MEM) 930 associated with or comprised in the data processor. According to some embodiments, the computer program may, when loaded into and run by the data processor, cause execution of method steps according to, for example, any of the methods illustrated in FIGS. 1, 3, 4, 5, or otherwise described herein.

Generally, all terms used herein are to be interpreted according to their ordinary meaning in the relevant technical field, unless a different meaning is clearly given and/or is implied from the context in which it is used.

Reference has been made herein to various embodiments. However, a person skilled in the art would recognize numerous variations to the described embodiments that would still fall within the scope of the claims.

For example, the method embodiments described herein discloses example methods through steps being performed in a certain order. However, it is recognized that these sequences of events may take place in another order without departing from the scope of the claims. Furthermore, some method steps may be performed in parallel even though they have been described as being performed in sequence. Thus, the steps of any methods disclosed herein do not have to be performed in the exact order disclosed, unless a step is explicitly described as following or preceding another step and/or where it is implicit that a step must follow or precede another step.

In the same manner, it should be noted that in the description of embodiments, the partition of functional blocks into particular units is by no means intended as limiting. Contrarily, these partitions are merely examples. Functional blocks described herein as one unit may be split into two or more units. Furthermore, functional blocks described herein as being implemented as two or more units may be merged into fewer (e.g. a single) unit.

Any feature of any of the embodiments disclosed herein may be applied to any other embodiment, wherever suitable. Likewise, any advantage of any of the embodiments may apply to any other embodiments, and vice versa.

Hence, it should be understood that the details of the described embodiments are merely examples brought forward for illustrative purposes, and that all variations that fall within the scope of the claims are intended to be embraced therein.

The invention claimed is:

1. A method for a wireless communication device served by a network access node of keeping a time reference at the wireless communication device, wherein the wireless communication device is configured for operation according to at least an operational mode and a sleep mode, the sleep mode having a lower power consumption than the operational mode, the method comprising:

during operation according to the operational mode, determining, by the wireless communication device and for the sleep mode, desired timings of timing signals to be transmitted from the network access node, wherein the desired timings indicate a time period during which the wireless communication device will listen for timing signal transmissions from the network access node when the wireless communication device is in the sleep mode; and transmitting, by the wireless communication device, a request signal to the network access node, wherein the request signal carries information of the desired timings of the timing signals to be transmitted from the network access node when the wireless communication device is in the sleep mode.

2. The method of claim 1, further comprising receiving a response signal from the network access node, wherein the response signal carries information of actual timings of the timing signals to be transmitted from the network access node when the wireless communication device is in the sleep mode.

3. The method of claim 2, further comprising switching to operation according to the sleep mode when at least some of the actual timings correspond to the desired timings.

4. The method of claim 3, further comprising:
acquiring an initial time reference during operation according to the operational mode; and
updating the time reference based on reception of the timing signals during operation according to the sleep mode.

5. The method of claim 4, further comprising switching to operation according to the first operational mode when reception of one or more timing signals fails.

6. The method of claim 1, wherein the desired timings of the timing signal transmissions from the network access node are defined by one or more of:
a periodicity of the timing signal transmissions; and
windows of time within which the timing signal transmissions occur.

7. A method for a network access node serving a wireless communication device of providing a time reference for the wireless communication device, wherein the wireless communication device is configured for operation according to at least an operational mode and a sleep mode, the sleep mode having a lower power consumption than the operational mode, the method comprising:
receiving a request signal from the wireless communication device operating in the operational mode, wherein the request signal carries information of desired timings of timing signals to be transmitted from the network access node, and wherein the desired timings indicate a time period during which the wireless communication device will listen for timing signal transmissions from the network access node when the wireless communication device is in the sleep mode; and
determining actual timings of the timing signals to be transmitted from the network access node when the wireless communication device is in the sleep mode based on the desired timings.

8. The method of claim 7, further comprising transmitting a response signal to the wireless communication device, wherein the response signal carries information of the determined actual timings of the timing signals to be transmitted from the network access node when the wireless communication device is in the sleep mode.

9. The method of claim 8, further comprising:
providing an initial time reference for the wireless communication device; and
transmitting the timing signals according to the actual timings.

10. The method of claim 7, wherein the desired timings of the timing signal transmissions from the network access node are defined by one or more of:
a periodicity of the timing signal transmissions; and
windows of time within which the timing signal transmissions occur.

11. An apparatus for a wireless communication device configured to be served by a network access node for keeping a time reference at the wireless communication device, wherein the wireless communication device is configured for operation according to at least an operational mode and a sleep mode, the sleep mode having lower power consumption than the operational mode, the apparatus comprising controlling circuitry configured to:

while operating according to the operational mode, determine, by the wireless communication device and for the sleep mode, desired timings of timing signals to be transmitted from the network access node, wherein the desired timings indicate a time period during which the wireless communication device will listen for timing signal transmissions from the network access node when the wireless communication device is in the sleep mode; and transmit, by the wireless communication device, a request signal to the network access node, wherein the request signal carries information of the desired timings of the timing signals to be transmitted from the network access node when the wireless communication device is in the sleep mode.

12. The apparatus of claim 11, wherein the controlling circuitry is further configured to receive a response signal from the network access node, wherein the response signal carries information of actual timings of the timing signals to be transmitted from the network access node.

13. The apparatus of claim 12, wherein the controlling circuitry is further configured to switch to the operation according to the sleep mode responsive to at least some of the actual timings corresponding to the desired timings.

14. The apparatus of claim 13, wherein the controlling circuitry is further configured to:
acquire an initial time reference during operation according to the operational mode; and
update the time reference based on reception of the timing signals during operation according to the sleep mode.

15. The apparatus of claim 14, wherein the controlling circuitry is further configured to cause switching to operation according to the operational mode responsive to reception of one or more timing signals fails.

16. The apparatus of claim 11, wherein the desired timings of the timing signal transmissions from the network access node are defined by one or more of:
a periodicity of the timing signal transmissions; and
windows of time within which the timing signal transmissions occur.

17. An apparatus for a network access node configured to serve a wireless communication device for providing a time reference for the wireless communication device, wherein the wireless communication device is configured for operation according to at least an operational mode and a sleep mode, the sleep mode having a lower power consumption than the operational mode, the apparatus comprising controlling circuitry configured to:
receive a request signal from the wireless communication device operating in the operational mode, wherein the request signal carries information of desired timings of timing signals to be transmitted from the network access node, wherein the desired timings indicate a time period during which the wireless communication device will listen for timing signal transmissions from the network access node when the wireless communication device is in the sleep mode; and
determine of actual timings of the timing signals to be transmitted from the network access node based on the desired timings when the wireless communication device is in the sleep mode.

18. The apparatus of claim 17, wherein the controlling circuitry is further configured to transmit a response signal to the wireless communication device, wherein the response signal carries information of the determined actual timings of the timing signals to be transmitted from the network access node.

19. The apparatus of claim 18, wherein the controlling circuitry is further configured to:
- provision an initial time reference for the wireless communication device; and
- transmit the timing signals according to the actual timings.

20. The apparatus of claim 17, wherein the desired timings of the timing signal transmissions from the network access node are defined by one or more of:
- a periodicity of the timing signal transmissions; and
- windows of time within which the timing signal transmissions occur.

* * * * *